US009088373B2

(12) United States Patent
van Rooyen (10) Patent No.: US 9,088,373 B2
(45) Date of Patent: Jul. 21, 2015

(54) METHOD AND SYSTEM FOR COMMUNICATING INFORMATION IN A WIRELESS COMMUNICATION SYSTEM

(75) Inventor: Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1458 days.

(21) Appl. No.: 11/237,323

(22) Filed: Sep. 28, 2005

(65) Prior Publication Data

US 2007/0070180 A1    Mar. 29, 2007

(51) Int. Cl.
*H04W 4/00* (2009.01)
*H04H 20/24* (2008.01)
*H04H 60/90* (2008.01)
*H04L 12/18* (2006.01)
*H04W 76/02* (2009.01)
*H04W 84/04* (2009.01)

(52) U.S. Cl.
CPC .............. *H04H 20/24* (2013.01); *H04H 60/90* (2013.01); *H04L 12/189* (2013.01); *H04W 76/02* (2013.01); *H04W 84/042* (2013.01)

(58) Field of Classification Search
CPC ................. H04N 21/41407; H04N 21/6131; H04N 21/64315; H04N 5/4401; H04N 21/6112; H04N 5/46; H04N 21/43637; H04N 21/44209; H04N 5/38; H04N 17/004; H04H 60/91; H04H 20/57; H04H 20/06; H04H 20/33; H04H 20/24; H04H 60/90; H04L 12/189; H04W 88/06; H04W 88/02; H04W 92/02; H04W 68/00; H04W 76/02

USPC ............ 455/426.1, 552.1, 193.1, 553.1, 260, 455/562.1; 370/321; 375/316, 345; 725/109, 112, 138, 153
See application file for complete search history.

(56) References Cited

U.S. PATENT DOCUMENTS

| 5,944,850 | A  | * | 8/1999 | Chouly et al. | ................. 714/790 |
| 6,133,910 | A  | * | 10/2000 | Stinebruner | ..................... 725/49 |
| 6,163,683 | A  | * | 12/2000 | Dunn et al. | ................. 455/151.1 |
| 6,430,722 | B1 | * | 8/2002 | Eroz et al. | ..................... 714/755 |
| 6,629,286 | B1 | * | 9/2003 | Berens et al. | ................. 714/755 |
| 6,665,829 | B2 | * | 12/2003 | Eroz et al. | ..................... 714/755 |
| 6,785,859 | B2 | * | 8/2004 | Goldman | ....................... 714/755 |

(Continued)

OTHER PUBLICATIONS

Lodewijk T. Smit, et al., *BER Estimation for HiperLAN/2*,, Dept. of Electrical Engineering, Mathematics & Computer Science University of Twente, Enschede, the Netherlands, pp. 165-179, Sep. 28, 2005.

*Primary Examiner* — Mahendra Patel
(74) *Attorney, Agent, or Firm* — Sterne, Kessler, Goldstein & Fox P.L.L.C.

(57) ABSTRACT

Methods and systems for communicating information in a wireless communication system are disclosed herein and may include determining at least a bit-error-rate (BER) for at least a DVB-H downlink communication path utilized for communicating multimedia content in a communication system. The communication system may include a plurality of downlink communication paths, at least two of the plurality of downlink communication paths may use different communication protocols, and at least one of the plurality of downlink communication paths may include the DVB-H downlink communication path. At least a portion of the multimedia content may be communicated via at least one of the plurality of downlink communication paths to at least one mobile communication device based on at least the determined at least the BER.

21 Claims, 5 Drawing Sheets

(56) References Cited

U.S. PATENT DOCUMENTS

| | | | |
|---|---|---|---|
| 6,857,098 B2 * | 2/2005 | Eroz et al. | 714/755 |
| 6,943,746 B2 * | 9/2005 | Talvitie et al. | 343/767 |
| 6,970,718 B2 * | 11/2005 | Iida | 455/553.1 |
| 7,024,480 B2 * | 4/2006 | Weik | 709/227 |
| 7,103,374 B2 * | 9/2006 | Yla-Jaaski et al. | 455/502 |
| 7,212,781 B2 * | 5/2007 | Hikomoto | 455/3.01 |
| 7,313,414 B2 * | 12/2007 | van Rooyen | 455/553.1 |
| 7,346,827 B2 * | 3/2008 | Eroz et al. | 714/755 |
| 7,444,165 B2 * | 10/2008 | van Rooyen | 455/552.1 |
| 7,450,900 B2 * | 11/2008 | van Rooyen | 455/3.06 |
| 7,454,683 B2 * | 11/2008 | Vesma et al. | 714/752 |
| 7,483,716 B2 * | 1/2009 | Rooyen et al. | 455/550.1 |
| 8,223,753 B2 * | 7/2012 | Hu et al. | 370/353 |
| 8,270,343 B2 * | 9/2012 | Tardy et al. | 370/328 |
| 2002/0002708 A1 * | 1/2002 | Arye | 725/95 |
| 2002/0059614 A1 * | 5/2002 | Lipsanen et al. | 725/75 |
| 2002/0176402 A1 * | 11/2002 | Karim | 370/352 |
| 2003/0228892 A1 * | 12/2003 | Maalismaa et al. | 455/575.7 |
| 2004/0014482 A1 * | 1/2004 | Kwak et al. | 455/522 |
| 2004/0171381 A1 * | 9/2004 | Inselberg | 455/426.2 |
| 2004/0179605 A1 * | 9/2004 | Lane | 375/240.18 |
| 2004/0198217 A1 * | 10/2004 | Lee et al. | 455/3.01 |
| 2005/0246749 A1 * | 11/2005 | Tsuruga et al. | 725/100 |
| 2006/0015908 A1 * | 1/2006 | Vermola et al. | 725/63 |
| 2006/0053450 A1 * | 3/2006 | Saarikivi et al. | 725/46 |
| 2006/0123099 A1 * | 6/2006 | Paila et al. | 709/219 |
| 2006/0127032 A1 * | 6/2006 | van Rooyen | 386/37 |
| 2006/0128302 A1 * | 6/2006 | van Rooyen et al. | 455/3.06 |
| 2006/0193295 A1 * | 8/2006 | White et al. | 370/336 |
| 2007/0064608 A1 * | 3/2007 | Rinne et al. | 370/230 |
| 2007/0064839 A1 * | 3/2007 | Luu | 375/340 |
| 2007/0206631 A1 * | 9/2007 | Parts et al. | 370/465 |
| 2007/0286262 A1 * | 12/2007 | Sestok et al. | 375/148 |
| 2009/0183050 A1 * | 7/2009 | Eroz et al. | 714/755 |

* cited by examiner

METHOD AND SYSTEM FOR COMMUNICATING INFORMATION IN A WIRELESS COMMUNICATION SYSTEM

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to communication of information via a plurality of different networks. More specifically, certain embodiments of the invention relate to a method and system for communicating information in a wireless communication system.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates that may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system utilizes trellis coding and 8-level vestigial sideband (8-VSB) modulation techniques. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM).

The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 µs for an 8 MHz channel. In the "8K" mode there are 6,817 carrier frequencies, each with useful symbol duration of 896 µs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level, which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

In a conventional wireless communication system, one or more handheld devices may receive information via a downlink communication path. However, channel conditions of the downlink communication path may vary, which may result in poor quality of the received information at the receiver. Furthermore, any information, which was not received by the receiver, may be re-transmitted which may result in processing delay.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for communicating information in a wireless communication system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for communicating information in a wireless communication system. The wireless communication system may comprise a plurality of base stations, such as a DVB-H base station, a cellular base station, an 802.11 wireless local area network (WLAN) base station, and an 802.16 wireless metropolitan area network (WMAN) base station. The base stations may be adapted to communicate multimedia information to a mobile terminal via a plurality of downlink communication paths. For example, a DVB-H base station and a downlink communication path may be utilized for communicating multimedia content to the mobile terminal. One or more downlink channel condition indicators may be measured during the communication of multimedia content. The downlink channel condition indicators may be measured by the mobile terminal and may be communicated to one or more of the base stations. For example, the mobile terminal may measure a bit-error-rate (BER) associated for one or more downlink communication paths, such as a DVB-H downlink communication path, a cellular downlink communication path, an IEEE 802.11 downlink communication path, and an IEEE 802.16 downlink communication path. Content selection may then be performed by one or more of the base station and multimedia content may be routed to the mobile terminal via one or more downlink communication paths, based on the content selection and/or the downlink channel condition indicators.

Figure 1:
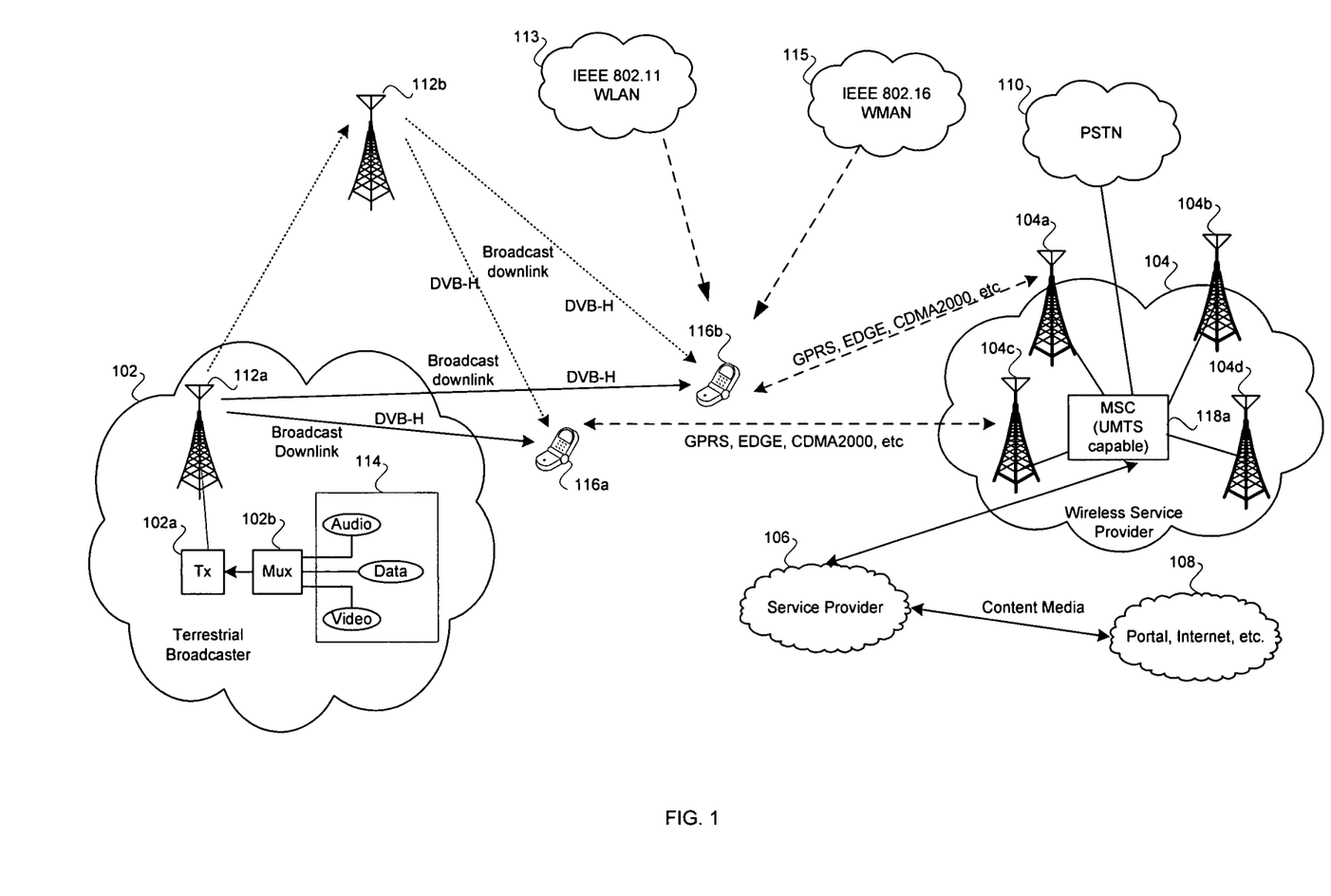
FIG. 1 is a block diagram of an exemplary communication system for providing services between a plurality of networks, in accordance with an embodiment of the invention.

FIG. 1 is a block diagram of an exemplary communication system for providing services between a plurality of networks, in accordance with an embodiment of the invention. Referring to FIG. 1, there is shown terrestrial broadcaster network 102, wireless service provider network 104, service provider 106, and network 108 which may comprise the Internet, a portal, for example. FIG. 1 further comprises public switched telephone network (PSTN) 110, an IEEE 802.11 wireless local area network (WLAN) 113, an IEEE 802.16 wireless metropolitan area network (WMAN) 115, and mobile terminals (MTs) 116a and 116b. The MT 116b may be within the range of the IEEE 802.11 WLAN 113 and the IEEE 802.16 WMAN 115. In this regard, the MT 116b may be adapted to receive multimedia content from one or more base stations within the IEEE 802.11 WLAN 113 and the IEEE 802.16 WMAN 115.

The terrestrial broadcaster network 102 may comprise transmitter (Tx) 102a, multiplexer (Mux) 102b, and information content source 114. The content source 114 may also be referred to as a data carousel, which may comprise audio, data, and/or video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a and 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe or stream for transmission by the transmitter 102a. In one embodiment of the invention, the data carousel 114 may be located outside the terrestrial broadcaster network 102. In this regard, information from the data carousel 114 may be communicated to the terrestrial broadcaster network 102 via a wireless and/or a wired connection.

Although communication links between the service provider 106 and the wireless service provider 104 may be wired communication links, the invention may not be so limited. Accordingly, the communication links may comprise a wireless communication link. In an exemplary embodiment of the invention, the communication link between the service provider 106 and the wireless service provider 104 may be an IEEE 802.x based communication link, such as an IEEE 802.16 WMAN or WiMax broadband access communication link. In another exemplary embodiment of the invention, the communication link may comprise a broadband line of sight (LOS) connection.

The wireless service provider network 104 may be a cellular network, such as a personal communications service network. Usage of the term cellular may comprise any band of frequencies that may be utilized for cellular telephone communication. The wireless service provider network 104 may utilize cellular access technologies such as GSM, CDMA, CDMA2000, WCDMA, HSDPA, AMPS, N-AMPS, and/or TDMA. The cellular network may be utilized to offer bidirectional services via uplink and downlink communication channels. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an IEEE 802.11 wireless local area network (WLAN). Additionally, the wireless service provider network 104 may also be adapted to provide GSM, CDMA, WCDMA, CDMA2000 based network services and/or variants thereof. In this regard, the mobile terminals 116a and 116b may also be compliant with the GSM, CDMA, WCDMA, CDMA2000, and IEEE 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the mobile terminals 116a and 116b and the wireless communication network 104. In an illustrative embodiment of the invention the service provider 106 may be adapted to utilize its interfaces to facilitate exchange of control information with the wireless communication network 104 and to exchange control information with the mobile terminals 116a and 116b. The control information exchanged by the service provider 106 with the wireless communication network 104 and the mobile terminals 116a and 116b may be utilized to control certain operations of the mobile terminals and the wireless communication network 104. Exemplary operations that may be controlled may comprise receiving multimedia content from the portal 108 and/or communicating multimedia content to a mobile terminal communicatively coupled to the wireless network 104.

In accordance with an embodiment of the invention, the service provider 106 may also comprise suitable interfaces, circuitry, logic and/or code that may be adapted to handle network policy decisions. For example, the service provider 106 may be adapted to manage a load on the wireless communication network 104. A load may indicate a total amount of data, such as multimedia content, which may be requested by a plurality of mobile terminals within the wireless network 104. Load management may be utilized to control how information such as media content is distributed by the wireless communication network 104 and the terrestrial broadcaster network 102. For example, load may be distributed among the base stations 104a, 104b, 104c, 104d so as to optimally provide cellular and/or broadcast services to the mobile terminals 116a and 116b.

The network or portal 108 may comprise suitable interfaces, logic, circuitry and/or code that may be adapted to provide content media to the service provider 106 via one or more communication links. These communication links, although not shown, may comprise wired and/or wireless communication links. The content media that may be provided by the network or portal 108 may comprise audio, data, video or any combination thereof. In this regard, the network or portal 108 may be adapted to provide one or more specialized information services to the service provider 106.

In another embodiment of the invention, the network or portal 108 may be adapted to provide multimedia content to one or more base stations within the IEEE 802.11 WLAN 113 and/or to the IEEE WMAN 115 via a wired and/or wireless connection. Furthermore, the IEEE 802.11 WLAN 113 and/or the IEEE WMAN 115 may be communicatively coupled to the data carousel 114 within the terrestrial broadcaster network 102. In this regard, one or more base stations within the IEEE 802.11 WLAN 113 and/or the IEEE WMAN 115 may receive multimedia data from the network or portal 108 and/or from the data carousel 114. Even though two multimedia sources, 108 and 114, are discussed with regard to FIG. 1, the present invention may not be so limited. The IEEE 802.11 WLAN 113 and/or the IEEE WMAN 115 may utilize other sources of multimedia data, which may be coupled via a wired and/or wireless connection to the IEEE 802.11 WLAN 113 and/or to the IEEE WMAN 115. The IEEE 802.11 WLAN 113 and/or the IEEE WMAN 115 may communicate multimedia data to the MT 116b via one or more downlink communication paths, such as an IEEE 802.11 WLAN downlink communication path and/or an IEEE WMAN downlink communication path.

The public switched telephone network (PSTN) 110 may be coupled to the MSC 118a. Accordingly, the MSC 118a may comprise suitable interfaces that may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110. In an embodiment of the invention, a T1 or T3 connection, for example, may be utilized to facilitate communication between the PSTN and the 110 and the MSC 118a.

In one aspect of the invention, the information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may receive the requested information via, for example, a cellular channel from the portal 108. The request may be initiated through an uplink cellular communication path.

The mobile terminals (MTs) 116a and 116b may comprise suitable logic, circuitry and/or code that may be adapted to handle the processing of downlink cellular channels for various access technologies and broadcast UHF/VHF technologies. Furthermore, the MTs 116a and 116b may be adapted to receive multimedia data via one or more downlink communication paths from the IEEE 802.11 WLAN 113 and/or from the IEEE WMAN 115. In an exemplary embodiment of the invention, the mobile terminals 116a and 116b may be adapted to utilize one or more cellular access technologies such as GSM, GPRS, EDGE, CDMA, WCDMA, and CDMA2000.

The mobile terminals may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may be adapted to receive VHF/UHF broadcast information from the VHF/UHF broadcast antennas 112a and 112b. In some instances, the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal, such as the mobile terminal 116b, may be adapted to receive broadcast information via a plurality of downlink communication paths. For example, the MT 116b may be adapted to receive multimedia content via a DVB-H broadcast communication path from the base station 112b and/or via a cellular downlink communication path from the base station 104a. Furthermore, the MT 116b may receive multimedia content from one or more base stations within the IEEE 802.11 WLAN 113 and/or the IEEE 802.16 WMAN 115. Content communicated from the base station 112b, the base station 104a, or from the IEEE 802.11 WLAN 113 and/or the IEEE WMAN 115 may be shaped or selected based on downlink channel conditions of the downlink communication paths utilized by the MT 116b. For example, the MT 116b may determine one or more downlink channel condition indicators associated with downlink communication paths utilized by the MT 116b. The downlink channel conditions may be communicated to one or more of the base stations, such as the cellular base station 104a. The cellular base station may then route multimedia content information from the network or portal 108 to the mobile 116b via one or more of the downlink communication paths, based on the received downlink channel conditions.

Figure 2:
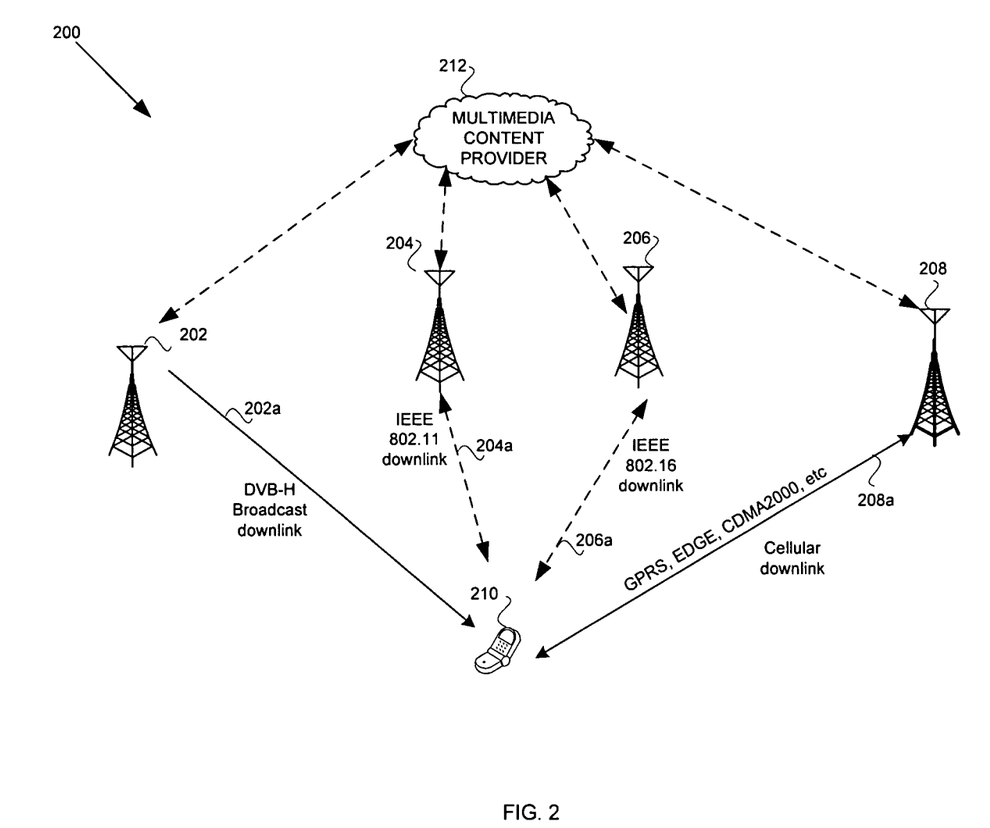
FIG. 2 is a block diagram of an exemplary communication system for communicating information from a DVB-H base station, a cellular base station, an IEEE 802.11 base station, and an IEEE 802.16 base station, in accordance with an embodiment of the invention.

FIG. 2 is a block diagram of an exemplary communication system for communicating information from a DVB-H base station, a cellular base station, an IEEE 802.11 base station, and an IEEE 802.16 base station, in accordance with an embodiment of the invention. Referring to FIG. 2, the communication system 200 may comprise a multimedia content provider 212, a plurality of base stations 202, . . . , 208 and a mobile terminal 210. The plurality of base stations 202, . . . , 208 may comprise a DVB-H base station 202, an IEEE 802.11 WLAN base station 204, an IEEE 802.16 WMAN base station 206, and a cellular base station 208. The DVB-H base station 202 may be adapted to communicate information to the mobile terminal 210 via the DVB-H downlink communication path 202a. The IEEE 802.11 WLAN base station 204 may be adapted to communicate information to the mobile terminal 210 via the IEEE 802.11 WLAN downlink communication path 204a. The IEEE 802.16 WMAN base station 206 may be adapted to communicate information to the mobile terminal 210 via the IEEE 802.16 WMAN downlink communication path 206a. The cellular base station 208 may be adapted to communicate information to the mobile terminal 210 via the cellular downlink communication path 208a.

In operation, the mobile terminal 210 may determine one or more downlink channel condition indicators for the downlink communication paths 202a, . . . , 208a. For example, the mobile terminal 210 may determine a bit-error-rate (BER) for each of the downlink communication paths 202a, . . . , 208a. The mobile terminal may then communicate the determined BER to one or more of the base stations 202, . . . , 208. For example, the determined BER may be communicated to the cellular base station 208. The cellular base station may utilize a processor, such as a content selection processor, to route multimedia content from the content provider 212 to the mobile terminal 210 via one or more of the downlink communication paths 202a, . . . , 208a. In this regard, the cellular base station 208 and/or the content selection processor may communicate one or more content selection signals to the multimedia content provider 212. Based on the content signals that are communicated to the multimedia content provider 212, multimedia content may be routed through one of the downlink paths 202a, 204a, 206a, and 208a to the mobile terminal 210.

A bit-error-rate (BER) algorithm, which may be utilized in accordance with the present invention, is disclosed in "BER Estimation for HiperLAN/2" (Lodewijk T. Smit, et al., International Federation for Information Processing, 2004), which is incorporated herein by reference.

Communication of the information selected from the multimedia content provider 212 may be apportioned between one or more of the downlink communication paths 202a, . . . , 208a, based on the downlink channel conditions of the communication paths. For example, the DVB-H downlink communication path 202a may be initially utilized to transmit video and audio content from the multimedia content provider 212 to the mobile terminal 210. Channel conditions at the mobile may be determined by various signal measurements taken by the mobile terminal 210. These measurements may be sent from the mobile terminal 210 to the cellular base station 208 via an uplink channel. In one embodiment of the invention, channel conditions for the DVB-H downlink communication path may be measured by the mobile terminal and a BER rate for the DVB-H link may be communicated to the cellular base station 208. Based on the channel measurements, the cellular base station 208 may apportion the media content, which may be delivered to the mobile terminal 210 via one ore more downlink communication paths. For example, if conditions on the DVB-H downlink deteriorate, audio content from the multimedia content provider 212 may be delivered to the mobile terminal 210 via the cellular downlink communication path 208a. In this regard, the DVB-H downlink communication path may be utilized to communicate the video portion of multimedia content, which may improve quality of service (QoS) on the DVB-H downlink communication path 202a.

In another exemplary embodiment of the invention, the cellular base station 208 may apportion multimedia content communication among one more communication paths based on the BER of the DVB-H downlink and an audio and/or video portion of the multimedia content may be routed away from the DVB-H downlink communication path. For example, the IEEE 802.16 downlink communication path 206a may be utilized for communicating video information from the multimedia content provider 212 to the mobile terminal 210, and the IEEE 802.11 downlink communication path 204a may be utilized for communicating audio information from the multimedia content provider 212 to the mobile terminal 210.

In one embodiment of the invention, information requiring higher bandwidth, such as latency-sensitive information, may be communicated to the mobile terminal 210 via a downlink communication path with greater bandwidth, such as the DVB-H downlink communication path 202a. Similarly, information that is not latency-sensitive may be communicated to the mobile terminal 210 via a lower bandwidth communication path, such as the cellular downlink communication path 208a. For example, when downloading a Web page, then video or graphics content may be communicated to the mobile terminal 210 from the DVB-H base station 202 via the DVB-H downlink communication path 202a. Text data may be communicated to the mobile terminal 210 from the cellular base station 208 via the cellular downlink communication path 208a using, for example, GPRS or EDGE. The amount and/or type of traffic that may be apportioned by a content selection processor, for example, to the DVB-H downlink communication path 202a and to the cellular downlink communication path 208a may be dynamically varied during transmission of data to the mobile terminal 210 or may be determined in advance and prior to any data transmission to the mobile terminal 210.

In one embodiment of the invention, a processor such as a channel condition processor may be utilized to determine downlink channel conditions of the downlink communication paths 202a, . . . , 208a. The channel condition processor may comprise suitable circuitry, logic, and/or code and may be adapted to determine one or more indications of downlink channel condition. For example, the channel processor may be adapted to determine bit error rate (BER), received signal strength indicator (RSSI), a signal-to-noise ratio (SNR), a signal-to-interference-and-noise ratio (SINR), power level, and/or signal gain associated with one or more of the downlink communication paths 202a, . . . , 208a. In one embodiment of the invention, the channel condition processor may be located within the mobile terminal 210 and may be utilized to determine downlink channel condition indicators of one or more of the downlink communication paths 202a, . . . , 208a.

The determined downlink channel condition indicators may be communicated to one or more of the base stations 202, ..., 208 for media content delivery selection.

Figure 3:
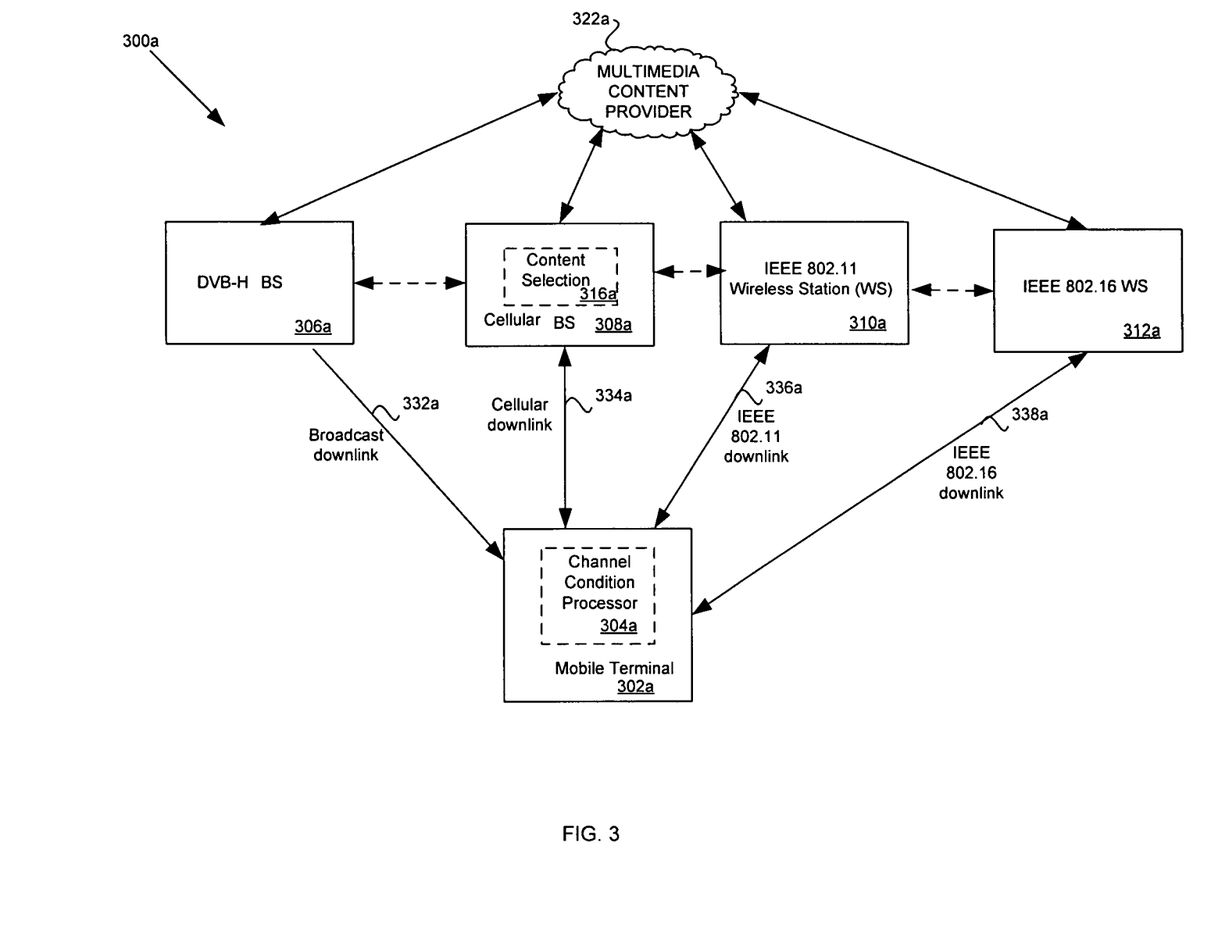
FIG. 3 is a block diagram of an exemplary communication system for communicating information from a plurality of base stations with content selection capabilities, in accordance with an embodiment of the invention.

FIG. 3 is a block diagram of an exemplary communication system for communicating information from a plurality of base stations with content selection capabilities, in accordance with an embodiment of the invention. Referring to FIG. 3, the communication system 300a may comprise a multimedia content provider 322a, a plurality of base stations 306a, ..., 312a and a mobile terminal 302a. The cellular base station 308a may comprise a content selection processor 316a. The mobile terminal 302a may comprise a channel condition processor 304a.

The plurality of base stations 306a, ..., 312a may comprise a DVB-H base station 306a, a cellular base station 308a, an IEEE 802.11 wireless station (WS) 310a, and an IEEE 802.16 WS 312a. The DVB-H base station 306a may be adapted to communicate information to the mobile terminal 302a via the DVB-H downlink communication path 332a. The IEEE 802.11 WS 310a may be adapted to communicate information to the mobile terminal 302a via the IEEE 802.11 downlink communication path 336a. The IEEE 802.16 WS 312a may be adapted to communicate information to the mobile terminal 302a via the IEEE 802.16 downlink communication path 338a. The cellular base station 308a may be adapted to communicate information to the mobile terminal 302a via the cellular downlink communication path 334a.

The channel condition processor 304a within the mobile terminal 302a may comprise suitable circuitry, logic, and/or code and may be adapted to determine one or more indications of downlink channel conditions for the downlink communication paths 332a, ..., 338a, respectively. For example, the channel condition processor 304a may be adapted to determine one or more downlink channel condition indicator, such as a bit-error-rate (BER), received signal strength indicator (RSSI), a signal-to-noise ratio (SNR), a signal-to-interference-and-noise ratio (SINR), power level, and/or signal gain associated with one or more of the downlink communication paths 332a, ..., 338a. The downlink channel condition indicators determined by the channel condition processor 304a may be communicated via the cellular downlink communication path 334a to the content selection processor 316a within the cellular base station 308a.

The content selection processor 316a may comprise suitable circuitry, logic, and/or code and may be adapted to select and apportion multimedia content from the multimedia content provider 322a for communication to the mobile terminal 302a via one or more of the downlink communication paths 332a, ..., 338a based on the downlink channel condition indicators received from the channel condition processor 304a. For example, the content selection processor 316a within the cellular base station 308a may receive BER indicators for the downlink communication paths 332a, ..., 338a from the channel condition processor 304a. The content selection processor 316a may then apportion communication of video content from the multimedia content provider 322a to the mobile terminal 302a via the DVB-H downlink communication path 332a. Furthermore, the content selection processor 316a may route communication of audio content from the multimedia content provider 322a to the mobile terminal 302a via the cellular downlink communication path 334a. Exemplary channel condition indicators that may be used by the content selection processor 316a may comprise BER, RSSI, SNR, and SINR.

Even though the content selection processor 316a is implemented within the cellular base station 316a, the present invention may not be so limited. A content selection processor may also be implemented within one or more of the remaining base stations, such as the IEEE 802.11 WS 310a and/or the IEEE 802.16 WS 312a.

In operation, the channel condition processor 304a may determine downlink channel conditions for the downlink communication paths 332a, ..., 338a. In accordance with an embodiment of the invention, the determined downlink channel condition indicators may be communicated to the content selection processor 316a within the cellular base station 308a via the communication path 334a. The content selection processor 316a may select and apportion multimedia content from the multimedia content provider 322a for communication to the mobile terminal 302a via one or more of the downlink communication paths 332a, ..., 338a based on the downlink channel condition indicators received from the channel condition processor 304a.

In one embodiment of the invention, the mobile terminal 302a may determine downlink channel condition indicators for each of the downlink communication paths 332a, ..., 338a prior to communicating any information by the base stations 306a, ..., 312a to the mobile terminal 302a. The determined downlink channel condition indicators may be communicated to the content selection processor 316a within the cellular base station 308a via the communication path 334a. The content selection processor 316a may determine how media content from the multimedia content provider 322a should be apportioned and routed to the mobile terminal 302a based on the received downlink channel condition indicators.

In another embodiment of the invention, the content selection processor 316a may select one of the plurality of base stations 306a, ..., 312a, to communicate at least a portion of content from the multimedia content provider 322a to the mobile terminal 302a. For example, the content selection processor 316a may select the DVB-H base station 306a to start communication of information from the multimedia content provider 322a. During communication of information to the mobile terminal 302a, the channel condition processor 304a within the mobile terminal 302a may determine channel condition indicators for the downlink communication paths 332a, ..., 338a. The content selection processor 316a may then compare the downlink channel condition indicators and may determine the downlink communication path with best channel conditions. Transmission of multimedia content, or a portion thereof, may then be apportioned and/or re-routed from the current downlink communication path to the downlink communication path with better downlink channel conditions. For example, the DVB-H downlink communication path 332a may deteriorate and content transmission may be apportioned among one or more of the remaining downlink communication paths 334a, ..., 338a.

In yet another embodiment of the invention, user profile data and/or prior usage data may be utilized to determine how media content and/or data may be apportioned and assigned to various downlink communication paths within the communication system 300a. For example, a user profile stored within the mobile terminal 302a, for example, may be communicated to the content selection processor 316a within the cellular base station 308a. The user profile may also be utilized to indicate a type of content that may be communicated to the mobile terminal 302a via a particular downlink communication path. The type of media content and/or data that may be communicated to the mobile terminal 302a via the various downlink communication paths 332a, ..., 338a may also be dependent on prior usage patterns.

For example, the mobile terminal 302a may communicate prior usage data and/or user profile data to the content selection processor 316a within the cellular base station 308a via the downlink communication path 334a. The prior usage data may indicate a type of downlink communication path that was previously used by the mobile terminal 302a to receive a particular type of multimedia data. For example prior usage data may indicate that the DVB-H downlink communication path 332a was used for communication of video data and the cellular downlink communication path 334a was used for communication of text data to the mobile terminal 302a. The user profile data may be generated by a user of the mobile terminal 302a and may also indicate a type of downlink communication path to be used for communication of certain type of content. After the content selection processor 316a receives prior usage data and/or user profile data from the mobile terminal 302a, the content selection processor 316a may indicate that content from the multimedia content provider 322a which is destined for the mobile terminal 302a may be delivered via one or more of the downlink communication paths 332a, . . . , 338a.

In another embodiment of the invention, the resolution of media content communicated to the mobile terminal 302a may be reduced or increased based on downlink channel conditions. For example, if channel conditions are good, then a maximum resolution or bit rate may be used to transfer multimedia content. As channel conditions deteriorate, for example, below a certain threshold, then the resolution of the content or the bit rate may be decreased accordingly. However, as downlink channel conditions within the communication system 300b improve, then the resolution or the bit rate of the media content may be increased accordingly.

Figure 4:
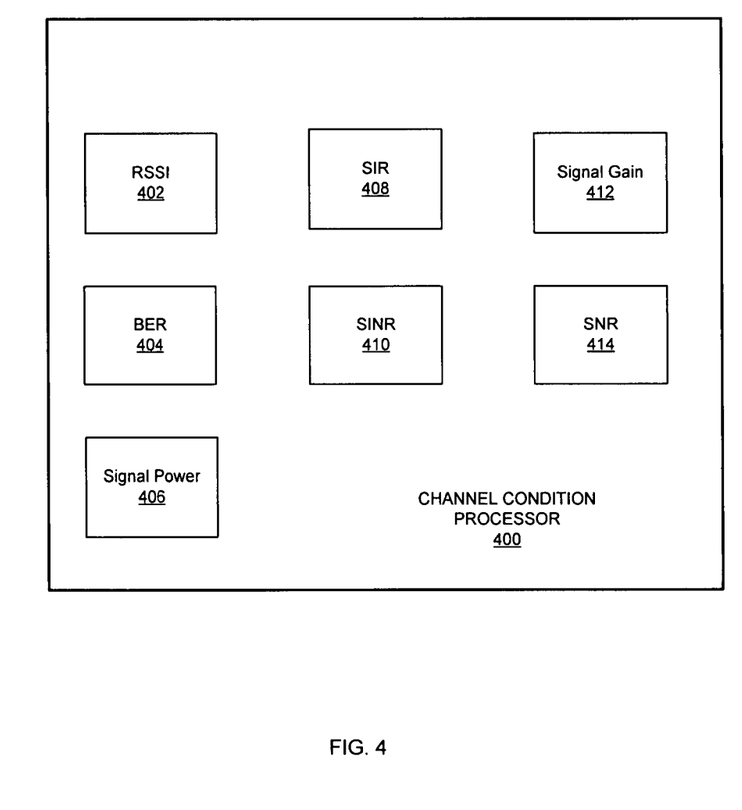
FIG. 4 is a block diagram of an exemplary channel condition processor, in accordance with an embodiment of the invention.

FIG. 4 is a block diagram of an exemplary channel condition processor, in accordance with an embodiment of the invention. Referring to FIG. 4, the channel condition processor 400 may comprise a bit error rate (BER) block 404, a received signal strength indicator (RSSI) block 402, a signal power block 406, a signal-to-noise ratio (SNR) block 414, a signal-to-interference-and-noise ratio (SINR) block 410, a signal-to-interference ratio (SIR) block 408, and signal gain block 412. The channel condition processor 400 may be the same as the channel condition processors 304a utilized within the communication system 300a in FIG. 3.

The bit error rate (BER) block 404 may comprise suitable circuitry, logic, and/or code and may be adapted to determine a BER for a downlink communication path. The received signal strength indicator (RSSI) block 402 may comprise suitable circuitry, logic, and/or code and may be adapted to determine an RSSI for a downlink communication path. The signal power block 406 may comprise suitable circuitry, logic, and/or code and may be adapted to determine signal power for signals communicated to a mobile terminal via a downlink communication path. The signal-to-noise ratio (SNR) block 414, the signal-to-interference-and-noise ratio (SINR) block 410, and the signal-to-interference ratio (SIR) block 408 may each comprise suitable circuitry, logic, and/or code and may be adapted to determine SNR, SINR, and SIR, respectively, for a signal communicated to a mobile terminal via a downlink communication path. The signal gain block 412 may comprise suitable circuitry, logic, and/or code and may be adapted to calculate signal gain for a signal communicated to a mobile terminal via a downlink communication path.

Figure 5:
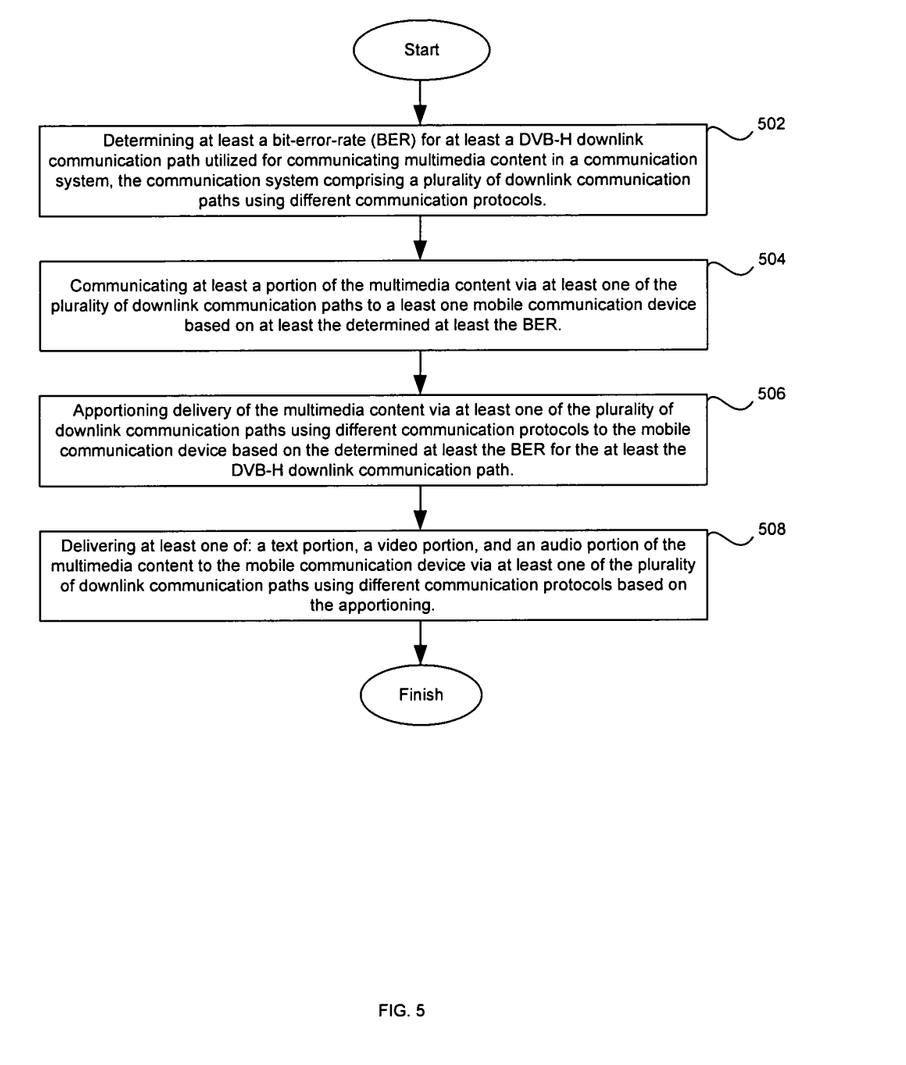
FIG. 5 is a flow chart illustrating exemplary steps for communicating information in a network, in accordance with an embodiment of the invention.

FIG. 5 is a flow chart illustrating exemplary steps for communicating information in a network, in accordance with an embodiment of the invention. Referring to FIGS. 3 and 5, at 502, at least a bit-error-rate (BER) may be determined for at least a DVB-H downlink communication path utilized for communicating multimedia content in the communication system 300a. The communication system 300a may comprise a plurality of downlink communication paths 332a, . . . , 338a using different communication protocols. At 504, at least a portion of the multimedia content may be communicated via at least one of the plurality of downlink communication paths 332a, . . . , 338a to a least one mobile communication device 302a based on at least the determined at least the BER. At 506, delivery of the multimedia content via at least one of the plurality of downlink communication paths 332a, . . . , 338a using different communication protocols to the mobile communication device 302a may be apportioned based on the determined at least the BER for the at least the DVB-H downlink communication path. At 508, at least one of: a text portion, a video portion, and an audio portion of the multimedia content 322a may be delivered to the mobile communication device 302a via at least one of the plurality of downlink communication paths 332a, . . . , 338a using different communication protocols based on the apportioning.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method, comprising:
   receiving, by a processing device, channel information associated with a plurality of downlink communication paths utilized for communicating multimedia content, wherein said plurality of downlink communication paths use different communication protocols;
   allocating, by the processing device, said multimedia content to said plurality of downlink communication paths based on said received channel information, a user profile, or a prior usage history for communicating said multimedia content to a mobile communication device over said plurality of downlink communication paths, wherein said user profile and said prior usage history are stored within said mobile communication device;
   causing delivery of a first portion of said multimedia content to said mobile communication device via a first one of said plurality of downlink communication paths using a first communication protocol; and
   causing delivery of a second portion of said multimedia content to said mobile communication device via a second one of said plurality of downlink communication paths using a second communication protocol based on said allocating, said second communication protocol being different from said first communication protocol.

2. The method according to claim 1, wherein said channel information comprises one or more of a received signal strength indicator (RSSI), a signal-to-noise ratio (SNR), a signal-to-interference-and-noise ratio (SINR), a power level, a bit error rate (BER), or a signal gain associated with said plurality of downlink communication paths.

3. The method according to claim 1, wherein said plurality of downlink communication paths comprises one or more of a DVB-H downlink communication path, a cellular downlink communication path, an IEEE 802.11 wireless local area network (WLAN) communication path, or an IEEE 802.16 wireless metropolitan area network (WMAN) communication path.

4. The method according to claim 1, wherein said second portion of said multimedia content comprises
   one or more of a text portion, a video portion, or an audio portion.

5. The method according to claim 1, wherein said allocating said multimedia content further comprises:
   allocating said multimedia content to said plurality of downlink communication paths based on a mobile communication device type.

6. The method according to claim 1, further comprising:
   adjusting a bit rate of one of a video portion of said multimedia content or an audio portion of said multimedia content based on a bit error rate (BER).

7. A non-transitory computer-readable medium having stored thereon computer-executable instructions, execution of which by a computing device causes the computing device to perform operations comprising:
   receiving channel information associated with a plurality of downlink communication paths utilized for communicating multimedia content, wherein said plurality of downlink communication paths use different communication protocols;
   allocating said multimedia content to said plurality of downlink communication paths based on said received channel information, a user profile, or a prior usage history for communicating said multimedia content to a mobile communication device over said plurality of downlink communication paths, wherein said user profile and said prior usage history are stored within said mobile communication device;
   causing delivery of a first portion of said multimedia content to said mobile communication device via a first one of said plurality of downlink communication paths using a first communication protocol; and
   causing delivery of a second portion of said multimedia content to said mobile communication device via a second one of said plurality of downlink communication paths using a second communication protocol based on said allocating, said second communication protocol being different from said first communication protocol.

8. The non-transitory computer-readable medium according to claim 7, wherein said channel information comprises one or more of a received signal strength indicator (RSSI), a signal-to-noise ratio (SNR), a signal-to-interference-and-noise ratio (SINR), a bit error rate (BER), or a signal gain associated with said plurality of downlink communication paths.

9. The non-transitory computer-readable medium according to claim 7, wherein said plurality of downlink communication paths comprises one or more of a DVB-H downlink communication path, a cellular downlink communication path, an IEEE 802.11 wireless local area network (WLAN) communication path, or an IEEE 802.16 wireless metropolitan area network (WMAN) communication path.

10. The non-transitory computer-readable medium according to claim 7, wherein said second portion of said multimedia content comprises
    one or more of a text portion, a video portion, and an audio portion.

11. The non-transitory computer-readable medium according to claim 7, wherein said allocating said multimedia content further comprises:
    allocating said multimedia content to said plurality of downlink communication paths based on a mobile communication device type.

12. The non-transitory computer-readable medium according to claim 7, wherein the operations further comprise:
    adjusting a bit rate of one of a video portion of said multimedia content or an audio portion of said multimedia content based on a bit error rate (BER).

13. A system, comprising:
    circuitry, logic, processor executing code, or any combination thereof configured to:
    receive channel information associated with a plurality of downlink communication paths utilized for communicating multimedia content, wherein said plurality of downlink communication paths use different communication protocols;
    allocate said multimedia content to said plurality of downlink communication paths based on said received channel information, a user profile, or a prior usage history for communicating said multimedia content to a mobile communication device over said plurality of downlink communication paths, wherein said user profile and said prior usage history are stored within said mobile communication device;
    cause delivery of a first portion of said multimedia content to said mobile communication device via a first one of said plurality of downlink communication paths using a first communication protocol; and
    cause delivery of a second portion of said multimedia content to said mobile communication device via a second one of said plurality of downlink communication paths using a second communication protocol based on said allocating, said second communication protocol being different from said first communication protocol.

14. The system according to claim 13, wherein said channel information comprises one or more of a received signal strength indicator (RSSI), a signal-to-noise ratio (SNR), a signal-to-interference-and-noise ratio (SINR), a power level, a bit error rate (BER), or a signal gain associated with said plurality of downlink communication paths.

15. The system according to claim 13, wherein said plurality of downlink communication paths comprises one or more of a DVB-H downlink communication path, a cellular downlink communication path, an IEEE 802.11 wireless local area network (WLAN) communication path, or an IEEE 802.16 wireless metropolitan area network (WMAN) communication path.

16. The system according to claim 13, wherein said second portion of said multimedia content comprises
one or more of a text portion, a video portion, and an audio portion.

17. The system according to claim 13, wherein said circuitry, logic, processor executing code, or any combination thereof is further configured to:
allocate said multimedia content to said plurality of downlink communication paths based on a mobile communication device type.

18. The system according to claim 13, wherein said circuitry, logic, processor executing code, or any combination thereof is further configured to adjust a bit rate of one of a video portion of said multimedia content or an audio portion of said multimedia content based on a bit error rate (BER).

19. The method of claim 1, wherein said channel information represents, for each respective downlink communication path of said plurality of downlink communications paths, one or more channel conditions experienced by a communications signal when transmitted over said respective downlink communication path.

20. The non-transitory computer-readable medium according to claim 7, wherein said channel information represents, for each respective downlink communication path of said plurality of downlink communications paths, one or more channel conditions experienced by a communications signal when transmitted over said respective downlink communication path.

21. The system according to claim 13, wherein said channel information represents, for each respective downlink communication path of said plurality of downlink communications paths, one or more channel conditions experienced by a communications signal when transmitted over said respective downlink communication path.

* * * * *